Nov. 17, 1959  E. V. GARNETT  2,913,194
CABLE REEL TRAILER

Filed June 25, 1956  3 Sheets-Sheet 1

INVENTOR.
EDWARD V. GARNETT
BY
Horace B. Van Valkenburgh
ATTORNEY

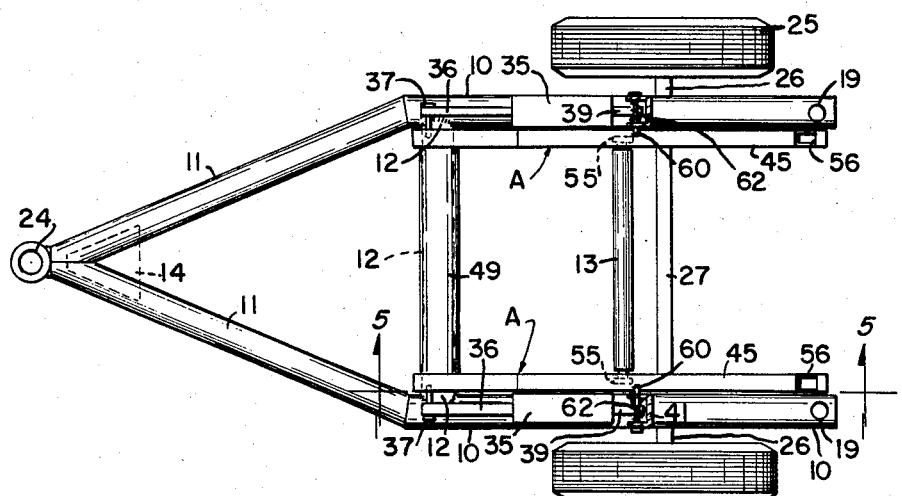
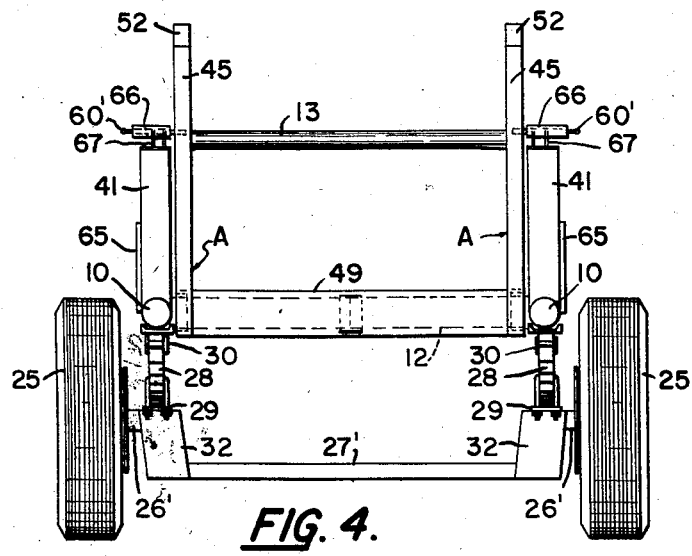
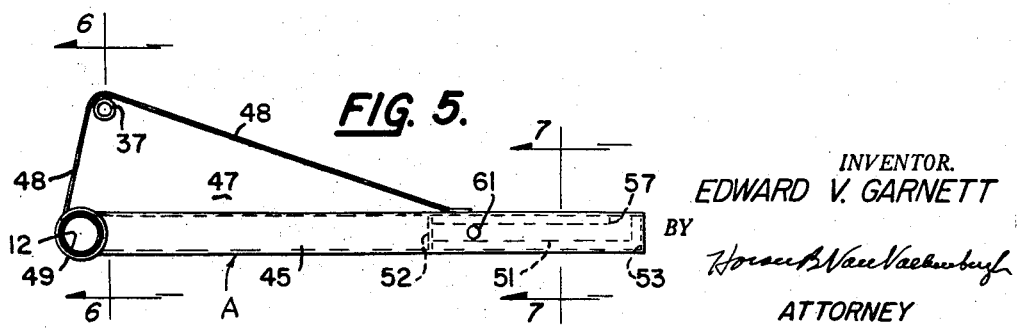

Nov. 17, 1959   E. V. GARNETT   2,913,194
CABLE REEL TRAILER

Filed June 25, 1956   3 Sheets-Sheet 3

INVENTOR.
EDWARD V. GARNETT
BY
Horace B. Van Valkenburgh
ATTORNEY

United States Patent Office 2,913,194
Patented Nov. 17, 1959

2,913,194

CABLE REEL TRAILER

Edward V. Garnett, Denver, Colo.

Application June 25, 1956, Serial No. 593,427

11 Claims. (Cl. 242—86.5)

This invention relates to trailers, and more particularly to trailers for the transportation and use of reels carrying cable or the like, such as electrical transmission cable, telephone transmission cable, and others. This invention thus relates to the subject matter of my copending application, Serial No. 405,349, filed January 21, 1954 and entitled "Cable Reel Trailers," now U.S. Patent No. 2,759,682.

Reels for carrying cable and the like generally comprise a drum having an annular flange at each side, made from metal, or the drums and flanges sometimes being made from wood with metal reinforcements at the center to engage a shaft. By supporting the shaft and reel in horizontal position, the reel may be turned to unwind the cable therefrom. When a wheeled trailer is provided, for transporting the reel to and from one or more places of use, the ends of the shaft may be placed in lifts or supports which are elevated, as by jacks, to a position in which the reel clears the ground, after which the trailer may be moved to a desired point. Such reels, when loaded, usually weigh a considerable amount, such as up to five tons, and the weight of the reels tends to produce relatively high stresses in supporting parts, while jolts and jars during transportation produce additional stresses which tend to bend the shaft or bar on which the reel is mounted and also may stress supporting parts beyond safe limits. Needless to say, if the shaft or bar on which the reel is mounted has been bent, it is difficult and may often be virtually impossible to turn the reel easily, in order to unroll the cable from the reel. Furthermore, a deflection or failure of a supporting part, or a bending of the reel shaft, may permit the reel and cable to strike the ground, and when this occurs while the trailer is being moved from one point to another, the reel and possibly sections of the cable itself may be damaged.

In my copending application Serial No. 405,349, a cable reel trailer is disclosed in which the wheels are placed at the rear of a U-frame open at the rear and a vertically disposed bracket for the reel shaft is provided with a series of vertically spaced supports, the brackets at each side being movable upwardly by a hydraulic cylinder. In one form, each cylinder is connected directly to the bracket and in another form, each cylinder engages a leaf spring adjacent the center, with each reel supporting bracket being mounted at the rear end of a leaf spring. In the one form, when the reel brackets are directly connected to the cylinders, a pivoted arm may be swung downwardly so as to engage the center of a leaf spring and thereby support the brackets, reel shaft and reel directly from the frame. In the form in which the hydraulic cylinders act on the leaf springs themselves, pivoted arms are moved upwardly to engage the leaf springs so as to transmit the weight directly to the frame. However, in each of these constructions, the wheels are placed at the rear and the reel in loaded position also may extend a considerable distance rearwardly from the trailer, while the frame and other parts are subjected to road shocks.

Among the objects of the present invention are to provide a novel trailer for cable reels; to provide such a trailer in which the reel may be moved readily to any desired position, and may be readily maintained in such position; to provide such a trailer in which sudden jars or jolts do not tend to unduly stress the supporting parts for a shaft or bar on which a loaded reel may be mounted, or the frame and associated parts of the trailer; to provide such a trailer in which hydraulic equipment may be utilized to raise or lower a loaded reel, but need not sustain the load during transportation; to provide such a trailer which is adapted to receive a reel shaft at the rear of the trailer and to elevate the reel and also move the reel to a central position; to provide such a trailer in which the wheels are relatively centrally located and the reel is carried above the wheels during transportation; to provide such a trailer which will accommodate different sizes of reels; to provide such a trailer which may exist in more than one form; and to provide such a trailer in which each such form is readily constructed and effective in operation.

Additional objects and the novel features of this invention will become apparent from the description which follows, taken in connection with the accompanying drawings, in which:

Fig. 3 is a top plan view of the trailer of Fig. 1;

Fig. 4 is a rear elevation of a modified form of the trailer of Fig. 1;

Fig. 5 is a fragmentary vertical section on a slightly enlarged scale, taken along line 5—5 of Fig. 3 and showing in side elevation a supporting arm for the cable reel shaft;

Fig. 9 is an enlarged side elevation of that portion of the arm shown in Fig. 8, but taken from the side opposite the position from which Fig. 5 is taken.

Figure 1:
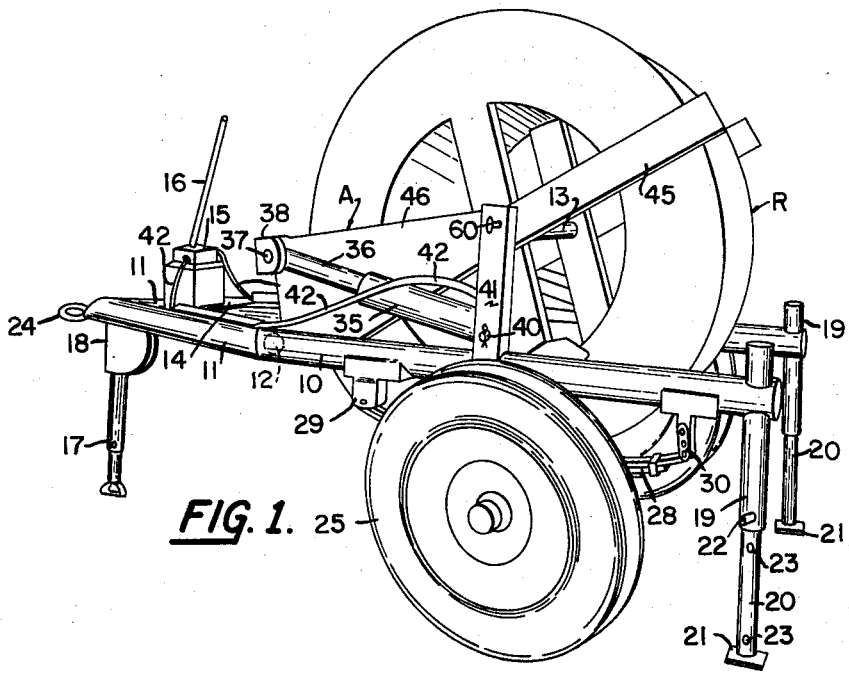
Fig. 1 is a perspective view of a trailer constructed in accordance with this invention, with a cable reel mounted thereon in position for transportation.
Figure 2:
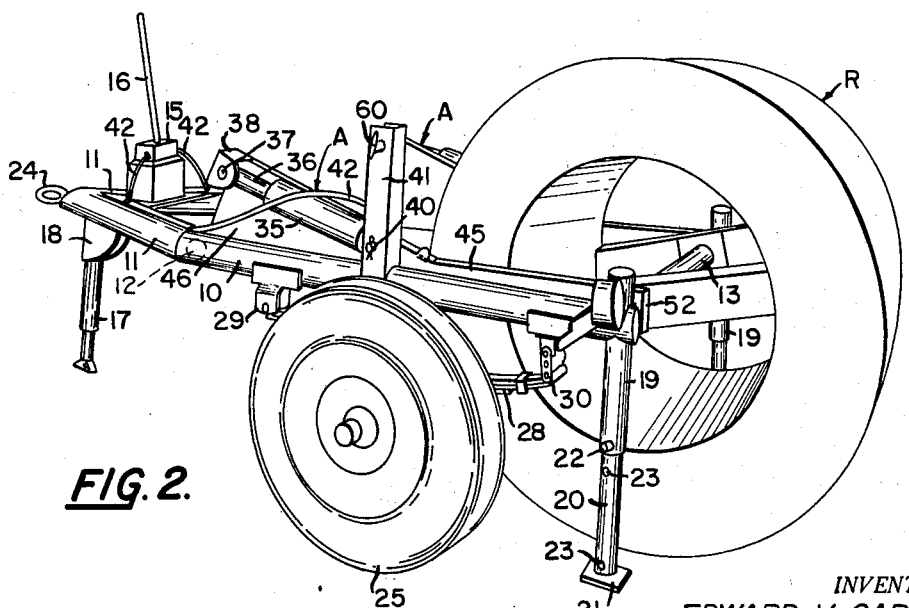
Fig. 2 is a similar perspective view of the trailer of Fig. 1, with the cable reel in a loading position.

As illustrated in Figs. 1 and 2, a trailer for cable reels and the like, such as cable reel R, may comprise a horizontal U-shaped framework open at the rear and formed principally of tubular members, such as heavy pipe. Thus, the framework may include a pair of horizontal, longitudinal side rails 10, the front ends of which may be attached, as by welding, to a pair of inwardly extending front rails 11, which are joined together at their front ends, as by welding. Side rails 10 may also be reinforced by a transverse shaft 12 extending therebetween, as in Fig. 3, shaft 12 conveniently being tubular with its ends cut to shape and welded to side rails 10. Shaft 12 provides a pivotal support, as described later, for arms A which support reel R through a reel shaft 13. A platform plate 14 may be attached, as by welding, across the top of the front rails 11 to support a hydraulic pump assembly 15 having an actuating hand lever 16, the pump assembly including an integral sump or well for receiving hydraulic fluid discharged from the various cylinders, as described later, and conventional valves for controlling the flow of hydraulic fluid to and from the pump assembly. A front jack 17 may be pivoted between the arms of a bracket 18 mounted on the underside of the front rails 11, at the front, so as to engage the ground and balance the trailer during loading or unloading or during use of the reel R when the cable thereon is unwound with the reel in an upper position, as in Fig. 1. If desired, a front wheel assembly including a pneumatic tire and mounted for pivotal movement between a horizontal storage position and a downwardly extending, ground engaging position, as well as including a hydraulic cylinder, as disclosed in copending application Serial No. 405,349, may be utilized. For additional stabilization at the rear, a vertical tube 19 may also extend through and be attached, as by welding, at the rear of each side rail 10, while a movable tube jack 20, provided with a footing 21 at the lower end, may be hydraulically actuated or may be adapted to be slipped downwardly in tube 19 and locked in position, as by a pin 22, to provide additional support for the trailer during loading or unloading. Pin 22 may be slipped into any one of a series of holes 23, depending upon the distance to the ground, the lowermost hole 23 being utilized to hold the tube jack 20 in an up or transportation position. An eye 24, or any other suitable type of connection, may be attached, as by welding, to the front end of rails 11 for connection with a truck or other vehicle for moving the trailer. Safety chains may also be provided, as in a conventional manner.

The principal supporting members for the framework comprise a pair of wheels 25, which may be of the type used for heavy duty trucks and include appropriate bearings, a brake drum and brake, and a hub on which may be mounted a pneumatic tire. The wheels 25 may be mounted on an axle 26 which may extend straight across beneath the frame, but preferably is provided with a dropped center 27, as in Fig. 10, to provide clearance for the reel R when in the position of Fig. 1, and thereby permit the reel to be carried in a lower position than otherwise. Inside each of the wheels 25, the axle 26 is attached to the underside of a leaf spring 28 as by a clevis and plate connection 29, as in Fig. 10, while the front end of each leaf spring 28 may be pivotally attached to a bracket 31 and the rear end to a shackle 30 on the underside of a side rail 10. Of course, any other suitable type of spring suspension, between the framework and the axle, may be utilized. In the modified construction illustrated in Fig. 4, a drop center 27' of the axle may extend between angular plates 32, conveniently forming a box structure and connected to stub axles 26', on which the wheels 25 are mounted. As will be evident, the wheels 25 are located adjacent the center of side rails 10 and with the reel R in the position of Fig. 1, the trailer is evenly balanced.

The reel R, which may be mounted on shaft 13, is supported by a lifting arm A on each side, the lifting arms A being adapted to pivot between a lower position, as in Fig. 2, for loading the reel onto or unloading the reel off the lifting arms, and an upper position, as in Fig. 1, in whch the reel shaft and reel are supported in an upper position between the wheels 25. Each lifting arm is moved between the lower and upper positions by a hydraulic cylinder 35 having a piston therein and a piston rod 36 extending therefrom, the piston rod 36 conveniently pivotally engaging a pin 37 mounted on the lifting arm A, while pin 37, if desired, may be reinforced by a box 38, open at the rear and on the underside, as in Figs. 1 and 2. The base of the cylinder 35 conveniently is provided with a lug 39 which pivotally engages a pin 40 of Figs. 1 and 2, which may extend between the sides of a post 41. Each post 41 may be channel-shaped, open at the front, as in Fig. 3, and mounted in upright position on the respective side rail 10, the lower end of each post 41 conveniently being welded to the side rail 10.

Also, the base of each cylinder 35 may be connected to the pump assembly 15 by a hose 42.

Figure 6:
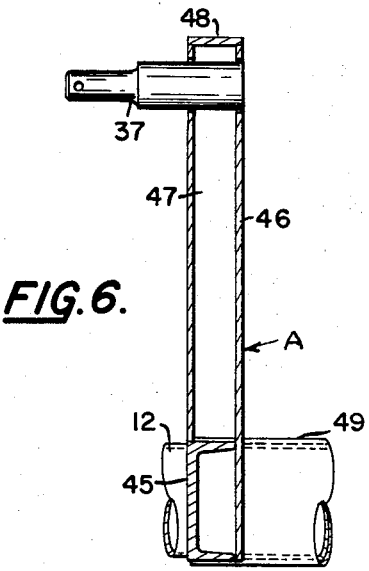
Fig. 6 is an enlarged vertical section, taken along line 6—6 of Fig. 5.
Figure 7:
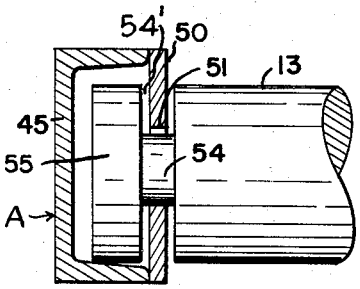
Fig. 7 is an enlarged vertical section, taken along line 7—7 of Fig. 5, showing also a portion of the reel shaft.
Figure 8:
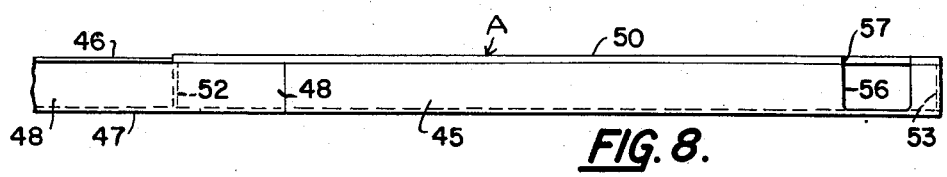
Fig. 8 is an enlarged fragmentary top plan view of the arm of Fig. 5.
Figure 9:
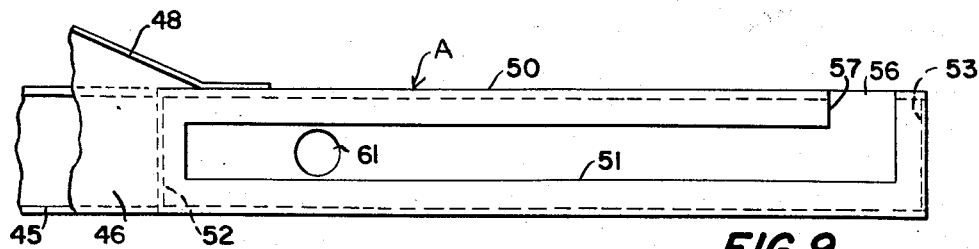

Each lifting arm A, as in Figs. 5–9, may include a channel 45 which extends longitudinally thereof with the open face disposed inwardly and a generally triangular plate 46 welded to the open face of the channel, as in Fig. 6, from a point approximately at the inner position of the reel shaft 13, as in Fig. 9, to the front end of the arm. A box-shaped structure is formed by channel 45, plate 46, a generally triangular plate 47 welded to the upper outer edge of channel 45, as in Fig. 6, and a strip 48, which is welded to plates 46 and 47. If desired, strip 48 may be formed as a flange integral with either of plates 46 or 47, while strip 48 is preferably welded to the top of channel 45 at its rear end, as in Fig. 9, and extends along the top and then down the front edge of the plates 46 and 47, as in Fig. 5. The front end of channel 45 and also the lower front edge of each of plates 46 and 47 and strip 48, may also be welded to a bearing tube 49 by which the arms A may pivot in unison about shaft 12. The pivot pins 37 for piston rod 36 may be attached, as by welding, to the opposite plates 46 and 47 so as to extend outwardly therefrom, as in Fig. 6. The plate 46, of course, closes the open side of channel 45 between the front end and the central position of reel shaft 13, while the remainder of the open side of channel 45, as in Figs. 7 and 9, may be closed by a plate 50 having a slot 51 which extends longitudinally along channel 45 between points spaced from a center stop 52 and an end stop 53. Center stop 52 may be welded in transverse position in channel 45, as at the end of plate 46, while end stop 53 may be welded to the rear end of channel 45. The distance between the ends of slot 51 and the respective stops 52 and 53 are preferably slightly less than the depth of a groove 54' in shaft 13 at a neck 54, as in Fig. 7, which enables the shaft 13 to roll along channel 45 with neck 54 received in groove 51 of plate 50 and an end section 55 of shaft 13 received in the enclosure formed by channel 45 and plate 50. As in Fig. 8, to enable each end section 55 of shaft 13 to be inserted within the channel 45 of the respective arm A, the top flange of channel 45 may be provided with a slot 56 having a width slightly greater than the diameter of end section 55 of shaft 13 and communicating with a transverse slot 57 in plate 50, which in turn communicates with slot 51, as in Fig. 9.

As will be evident, when the arms A are lowered to the position of Fig. 2, the trailer may be moved into an appropriate position so that when the arms A are raised slightly, the end sections 55 of shaft 13 will move through the channel slot 56 and plate slot 57 into the respective channels 45. The position of the arms A, between the side rails 10 of the framework, permits the arms A to be lowered sufficiently that reels of relatively small diameter, as well as larger reels, may be picked up. The end stops 53, of course, prevent the shaft from rolling rearwardly out of the channel, in the event the channels are inclined rearwardly. When the arms A are lifted, the reel and reel shaft will be raised and the reel shaft will then roll forwardly down the channel, carrying the reel R with it, until the end sections 55 of the reel shaft 13 engage the center stop 52. Then, the arms A may be further lifted in unison until the reel and its shaft reach the upper or support position of Fig. 1 in which the reel R is in a well balanced position, as contrasted with certain other types of reel carriers in which the reel shaft is disposed at the rear of the trailer and therefore the load of the reel is unbalanced and centered rearwardly of the wheels. A well balanced position of the reel prevents the production of an upward movement at the front of the trailer, which tends to upset the trailer rearwardly when the trailer is disconnected from a truck or the like. Of course, for lifting the arms A, hydraulic fluid under suitable pressure is supplied to the cylinders 35 by the pump through hoses 42. After the arms A and reel R reach the upper position of Fig 2, a locking pin 60 of Fig. 2 may be pushed inwardly to engage a hole 61 in the web of channel 45, shown in Figs. 5 and 9, the hole 61 preferably being spaced from the stop 52 a distance slightly greater than the diameter of the reel shaft to be received in the channel 45, so that each lock pin 60 may also form a rear stop for the shaft, preventing the shaft and reel from moving rearwardly along the channel 45, particularly when the trailer is being moved uphill. Each of the lock pins 60, as in Fig. 3, may be provided with a collar or shoulder inside the post 41 adapted to engage a compression spring 62, or the inner end of spring 62 may be attached, as by welding, to pin 60, so that each lock pin may be pulled outwardly and angled slightly so that the inner end, when so withdrawn, will abut against the inside of the post 41, to insure that each lock pin will remain retracted during elevation of the reel. After the reel is elevated and the arms A are in position to receive the lock pins 60, the inner end of each pin 60 may be reinserted in the inner hole of post 41 so as to extend into the hole 61 in the respective arm A.

After the lock pins 60 have been placed in locking position on each side, the hydraulic pressure within each cylinder 35 may be released by an appropriate valve with which the pump assembly 15 is provided. Then, the front jack 17 may be retracted and each of the rear movable jack tubes 20 placed in an upper position in tube 19 and held in that position by pin 21. Of course, the trailer has previously been attached to the vehicle which is to draw it, so that the trailer carrying the reel may be moved along the roadway to the position of use. For unreeling cable from the reel R, the reel may be left in the position of Fig. 2. Or, if the reel is to be unloaded onto the ground or the like, the rear jack tubes 20 are dropped and secured in position by pins 21, after which the front jack 17 may be pivoted to engage the ground, while, if desired, the vehicle by which the trailer is drawn may then be disconnected. If the reel is to be unloaded, hydraulic fluid under pressure is then supplied to cylinders 35, so that the load will be taken off lock pins 60, which may be retracted and the arms A lowered slowly by bleeding fluid from the cylinders 35. As soon as the channels 45 of arms A reach a position slanting slightly toward the rear, the reel shaft 13 will automatically roll rearwardly along the channels until the end stops 52 are engaged, whereupon the arms A may then be lowered further, until the reel R itself rests on the ground and the rear ends of channels 45 drop below the reel shaft 13. The reel may be blocked in position or otherwise handled, as desired, while the trailer may then be driven away to carry the next reel. In any event, when the reel and trailer are to be left standing, after the trailer is disconnected from a truck or the like, it is always desirable to drop both the front and rear jack legs, for safety purposes.

In the modified form shown in Fig. 4, gusset plates 65 may be welded between each post 41 and the respective side rail 10, both fore and aft of the post, or a single gusset plate extending both fore and aft may be provided. Also, each lock pin 60' may be mounted in a barrel 66 supported by a bracket 67 atop a post 41, while a spring for each lock pin 60' may be installed within the barrel 66.

Figure 10:
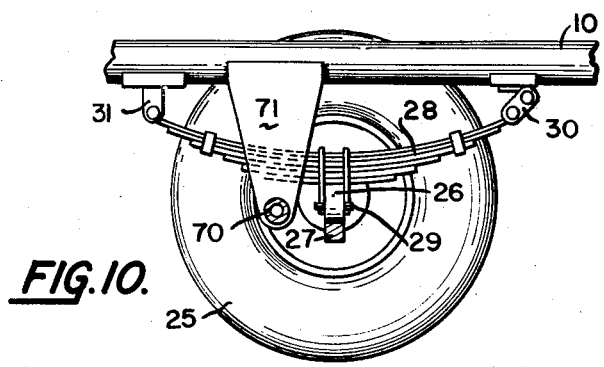
Fig. 10 is a fragmentary vertical section, looking outwardly from the center of the trailer and illustrating a further modification of the trailer of Fig. 1.

In the modified form of trailer shown in Fig. 10, a transverse tubular rod 70 may be supported by a bracket plate 71 extending downwardly from and conveniently welded to the inside of each side rail 10. Rod 70 is preferably spaced slightly above and forwardly of the drop center 27 of the axle, so that a large diameter reel R will not tend to rest on the axle and thereby tend to be wedged in a forward position, but will instead engage rod 70 before engaging the axle and will thereby tend to be moved rearwardly as arms A are lowered.

From the foregoing, it will be evident that a cable reel trailer constructed in accordance with this invention fulfills to a marked degree the requirements and objects hereinbefore set forth. As will be evident, the reel is readily moved to any desired position, particularly the upper support position, and is readily maintained in position, either by the hydraulic cylinders or by the locking pins. Also, the heavy leaf springs which are mounted on the axle assembly prevent sudden shocks or jars from unduly stressing the reel shaft or the directly supporting parts therefor, as well as relieving the entire framework of the trailer from such shocks or jars. An axle which extends between the wheels, directly beneath the reel being carried, not only adds stability to the trailer, but also assists appreciably in resisting the side thrust produced by the relatively heavy load being carried and thereby tending to spread the rear ends of the U-shaped framework apart. It is to be noted that the posts which support the reel arms in upper position, as well as the point of application of thrust by the cylinders, are substantially directly above the axle. In addition, the shaft about which the reel supporting arms pivot also serves as a connection between the side rails. Thus, the construction is particularly sturdy. The hydraulic cylinders are readily operated with a minimum of manual effort, to raise and lower the reel, as between an upper transportation position and a lower unloading or loading position. As will also be evident, the reel is readily loaded and unloaded on the trailer, since the movement of the supporting arms may be controlled with accuracy by appropriate control of the hydraulic cylinders. In addition, the reel may be engaged by the supporting arms and moved to an upper support position by the simple step of actuating the hydraulic cylinders, as well as vice versa.

Although a preferred embodiment of this invention has been illustrated and described and certain modifications also illustrated and described, it will be understood that other embodiments may exist and other modifications may be made, all without departing from the spirit and scope of this invention.

What is claimed is:

1. A trailer for a reel normally mounted on a shaft, comprising a generally U-shaped frame open at the rear and having rearwardly extending side rails; a lifting arm adjacent each side rail and movable upwardly and downwardly, said lifting arms being constructed and arranged to engage said reel shaft and to raise and lower said shaft and said reel therewith; a ground engaging wheel adjacent each side rail; an axle extending between said wheels and transversely of said side rails; a spring between said axle and each said side rail; a bracket extending downwardly from each side rail forwardly of said axle; and a rod extending transversely between said brackets at a position above the central portion of said axle.

2. A trailer for a reel normally mounted on a shaft, comprising a generally U-shaped frame open at the rear and having rearwardly extending side rails; a second shaft extending between said side rails adjacent the forward ends thereof; a lifting arm adjacent each side rail and movable upwardly and downwardly, said lifting arms being pivotally mounted adjacent the forward ends thereof on said second shaft and said arms being constructed and arranged to engage said reel shaft and to raise and lower said shaft and said reel therewith; and a ground engaging wheel adjacent each side rail and disposed rearwardly of said second shaft for supporting said frame.

3. A reel trailer, as defined in claim 2, wherein said arms are connected to a tubular member surrounding said shaft and are pivotal in unison therewith.

4. A trailer for a reel normally mounted on a shaft, comprising a frame open at the rear and having rearwardly extending side rails; a ground engaging wheel adjacent each side rail for supporting said frame; a rearwardly extending lifting arm adjacent each side rail and movable upwardly and downwardly, said lifting arms being pivotally mounted adjacent the forward ends thereof on said frame forwardly of said wheels and said lifting arms being constructed and arranged to engage said reel shaft and to raise and lower said shaft and said reel therewith, each said arm having an upstanding portion at the forward end thereof; and hydraulic means for moving each said arm and extending forwardly between said frame and the corresponding arm, each said hydraulic means being connected to said upstanding portion of the corresponding arm at an elevated position.

5. A reel trailer, as defined in claim 4, wherein the upstanding portion of each said arm is generally triangular, the corresponding hydraulic means is pivotally connected to said arm at the upper forward apex of said triangular portion, and each said arm includes a channel member extending rearwardly from said triangular portion for receiving an end of said reel shaft.

6. A reel trailer, as defined in claim 5, wherein said reel shaft is provided with an annular groove spaced from each end, thereby providing end sections of said shaft; and wherein each said arm channel member is substantially closed except for a longitudinal slot on the inside and a slot in the top thereof adjacent the rear end and communicating with said longitudinal slot, whereby each end section of said reel shaft may be received in an upper slot and thence in said channel, so that said end sections will move forwardly within said channels as said channels are raised above a horizontal position and will move rearwardly in said channels as said channels are lowered below a horizontal position.

7. A reel trailer, as defined in claim 4, including an upright post mounted on each side rail; wherein each said hydraulic means is pivotally attached to the corresponding post adjacent the lower end thereof; and including a transversely movable pin mounted in an upper position on each post and movable inwardly to engage the corresponding arm and thereby support said arm in an upper position.

8. A reel trailer, as defined in claim 7, wherein each said pin is positioned so as to act as a stop to prevent rearward movement of said reel shaft in said upper position.

9. A trailer for a reel normally mounted on a shaft, comprising a generally U-shaped frame open at the rear and having rearwardly extending side rails; a lifting arm pivoted at its forward end adjacent each side rail, said lifting arms being constructed and arranged to engage said reel shaft and to raise and lower said shaft and said reel therewith; hydraulic means for moving said arms upwardly and downwardly; an upright post mounted on each side rail rearwardly of the pivot position of the corresponding arm; means mounted on each said post for engaging the corresponding arm and supporting said arm in an upper position; a ground engaging wheel adjacent each side rail; an axle extending between said wheels and transversely of said side rails; and a spring between said axle and each said side rail.

10. A wheeled trailer for a reel normally mounted on a shaft comprising a generally U-shaped frame open at the rear and having rearwardly extending side rails and forwardly converging front rails, said frame also having a tubular shaft extending transversely between said side rails adjacent the forward ends thereof; a tubular sleeve surrounding said frame shaft for pivotal movement thereon; a lifting arm attached to said sleeve adjacent each side rail, each said arm being attached to said sleeve adjacent its forward end and including a channel having an upper and a lower flange and an outer web, an adjacent channel having a length corresponding to the length of said side rails rearwardly of said shaft, generally triangular plates attached to said channel and to said sleeve and extending from said sleeve to a point centrally of said channel, said plates being attached to opposite sides of said channel and extending upwardly therefrom, and a plate closing the inner open face of said channel, said last-mentioned plate having a longitudinally extending slot and a transverse slot communicating with said longitudinal slot adjacent the rear end thereof, the upper flange of said channel having a slot therein communicating with said transverse slot, said reel shaft having an annular groove therein adjacent each end providing an end section at each end of said shaft adapted to be received through said slot in said outer flange of said channel and adapted to move along the inside of said channel, said longitudinal slot having a width less than the diameter of said shaft end portion; an upright post mounted on each side rail slightly forwardly of the position of said axle; and a hydraulic cylinder for each arm provided with a piston and piston rod, said cylinder and piston rod being pivotally connected to and extending between said post and said triangular plate adjacent the forward upper end thereof.

11. A reel trailer, as defined in claim 10, including a bracket attached to and extending downwardly from the inside of each side rail at a position forward of said axle; and a bar extending transversely of said trailer between said brackets and disposed in a position forwardly of and above the drop center portion of said axle.

References Cited in the file of this patent

UNITED STATES PATENTS

| | | |
|---|---|---|
| 1,921,233 | Kuchar | Aug. 8, 1933 |
| 2,355,441 | Jacob | Aug. 8, 1944 |
| 2,576,425 | Thearle | Nov. 27, 1951 |
| 2,624,522 | Van Hook | Jan. 6, 1953 |